United States Patent
Ortiz et al.

(10) Patent No.: US 10,653,242 B2
(45) Date of Patent: May 19, 2020

(54) RACING GAMING CHAIR

(71) Applicant: Ace Casual Limited, Bradford (GB)

(72) Inventors: Jose Ortiz, Wayzata, MN (US); Gareth Case, Bradford (GB); Gary Shaw, Bradford (GB)

(73) Assignee: Ace Casual Limited, Bradford (GB)

( * ) Notice: Subject to any disclaimer, the term of this patent is extended or adjusted under 35 U.S.C. 154(b) by 0 days.

(21) Appl. No.: 16/120,276

(22) Filed: Sep. 2, 2018

(65) Prior Publication Data
US 2020/0069059 A1 Mar. 5, 2020

(51) Int. Cl.
| | | |
|---|---|---|
| *A47C 4/00* | (2006.01) | |
| *A47C 4/28* | (2006.01) | |
| *A47C 7/50* | (2006.01) | |
| *A47C 7/52* | (2006.01) | |
| *A47C 7/72* | (2006.01) | |
| *A47C 1/00* | (2006.01) | |
| *A63F 11/00* | (2006.01) | |
| *A47C 7/62* | (2006.01) | |

(52) U.S. Cl.
CPC .......... *A47C 1/00* (2013.01); *A47C 4/28* (2013.01); *A47C 7/62* (2013.01); *A63F 11/00* (2013.01)

(58) Field of Classification Search
CPC .... A47C 1/00; A47C 4/28; A47C 7/62; A63F 11/00
USPC ............ 297/23, 217.3, 217.4, 423.26, 423.3
See application file for complete search history.

(56) References Cited

U.S. PATENT DOCUMENTS

| | | | | |
|---|---|---|---|---|
| 217,608 A | * | 7/1879 | Gifford et al. | A47C 4/40 297/23 |
| 240,991 A | * | 5/1881 | Fuller | A47C 4/40 297/23 |
| 254,133 A | * | 2/1882 | Holt | A47C 13/00 297/129 |
| 297,014 A | * | 4/1884 | Rundell | A47C 4/40 297/23 |
| 379,670 A | * | 3/1888 | Whitehead | A47C 4/40 297/23 |
| 534,501 A | * | 2/1895 | Evers | A47C 4/40 297/23 |

(Continued)

FOREIGN PATENT DOCUMENTS

| | | | | |
|---|---|---|---|---|
| ES | 2381095 A1 | 5/2012 | | |
| GB | 2209665 A | * | 5/1989 | A47C 4/50 |

OTHER PUBLICATIONS

International Search Report and Written Opinion received in PCT/IB2019/000865 on Dec. 13, 2019, 13 pgs.

(Continued)

*Primary Examiner* — Rodney B White
(74) *Attorney, Agent, or Firm* — Moss & Barnett; Michael A. Bondi

(57) ABSTRACT

A racing gaming chair having a seat frame, a back frame, a pedal assembly attachment and a steering wheel assembly attachment. The back frame is pivotally attached to the seat frame. The pedal assembly attachment is operably attached to at least one of the back frame and the back frame. The pedal assembly attachment is adapted for attachment of a pedal assembly thereto. The steering wheel assembly attachment is operably attached to at least one of the seat frame and the back frame. The steering wheel assembly attachment is adapted for attachment of a steering wheel assembly thereto.

21 Claims, 8 Drawing Sheets

(56) References Cited

U.S. PATENT DOCUMENTS

| | | | | |
|---|---|---|---|---|
| 1,033,108 A * | 7/1912 | Lehmann | A47C 4/40 | 297/23 |
| 1,039,078 A * | 9/1912 | Arnold | A47C 4/52 | 297/17 |
| 1,155,366 A * | 10/1915 | Myers | A47C 4/40 | 297/23 |
| 1,240,243 A * | 9/1917 | Norberti | A47C 4/40 | 297/23 |
| 1,372,546 A * | 3/1921 | Read | A61G 5/08 | 297/23 |
| 1,429,388 A * | 9/1922 | Wedemann | A47C 4/42 | 297/23 |
| 1,443,921 A * | 1/1923 | Mackenzie | A47C 7/66 | 297/23 |
| 1,462,005 A * | 7/1923 | Hall | A47C 1/143 | 297/23 |
| 1,601,043 A * | 9/1926 | Schneider | A47C 4/40 | 297/23 |
| 1,728,849 A * | 9/1929 | Bailly | A47C 4/40 | 248/164 |
| 1,923,517 A * | 8/1933 | Swaninger | A47C 7/66 | 297/23 |
| 1,933,040 A * | 10/1933 | Baker | A47C 4/30 | 297/23 |
| 1,935,238 A * | 11/1933 | Danzer | A47C 4/40 | 297/23 |
| 1,979,278 A * | 11/1934 | McMurtry | A47C 4/30 | 297/23 |
| 2,006,823 A * | 7/1935 | Beeskow | A47C 4/32 | 297/23 |
| 2,044,364 A * | 6/1936 | Parry | A47C 4/40 | 297/23 |
| 2,052,955 A * | 9/1936 | Vanderminden | A47C 4/40 | 297/23 |
| 2,096,169 A * | 10/1937 | Friesner | A47C 4/50 | 297/23 |
| 2,137,427 A * | 11/1938 | Thomson | A47C 4/40 | 297/23 |
| 2,381,149 A * | 8/1945 | Wenneborg | A47C 4/40 | 297/23 |
| 2,660,224 A * | 11/1953 | Frisch | A47C 4/40 | 297/23 |
| 2,735,479 A * | 2/1956 | Bugg | A47C 7/506 | 297/23 |
| 3,936,955 A * | 2/1976 | Gruen | G09B 9/048 | 434/63 |
| 4,252,367 A * | 2/1981 | Vanderminden | A47C 4/40 | 297/23 |
| 4,276,030 A * | 6/1981 | Radice | G09B 9/04 | 434/62 |
| 5,885,080 A * | 3/1999 | Letovsky | G09B 9/04 | 434/29 |
| 5,911,634 A * | 6/1999 | Nidata | A63F 13/08 | 472/59 |
| 5,951,018 A * | 9/1999 | Mamitsu | G09B 9/02 | 273/442 |
| 6,044,772 A * | 4/2000 | Gaudette | A63F 13/08 | 108/43 |
| 6,083,106 A * | 7/2000 | McDowell | A63F 13/02 | 463/46 |
| 6,530,842 B1 * | 3/2003 | Wells | G07F 17/32 | 273/143 R |
| 6,568,334 B1 * | 5/2003 | Gaudette | A63F 13/08 | 108/43 |
| 6,776,104 B2 * | 8/2004 | Herbst | A63F 13/02 | 108/25 |
| 6,843,527 B2 * | 1/2005 | Nelson | A47C 4/40 | 297/129 |
| 7,125,074 B2 * | 10/2006 | Real | A47C 7/72 | 297/217.3 |
| 7,156,026 B2 * | 1/2007 | McClellion | A63F 13/02 | 108/43 |
| 7,297,060 B2 * | 11/2007 | Brase | A47C 3/16 | 463/36 |
| 7,662,042 B2 * | 2/2010 | Oswald | A47C 15/004 | 463/46 |
| 7,717,502 B2 * | 5/2010 | Deng | A47C 4/20 | 297/16.1 |
| 7,753,787 B2 * | 7/2010 | Arche | A63F 13/06 | 463/37 |
| 7,828,157 B2 * | 11/2010 | Thorsen | A63F 13/06 | 211/26.2 |
| 7,857,311 B2 * | 12/2010 | Minke | A63F 13/02 | 273/148 R |
| D656,553 S * | 3/2012 | Blaskov | D21/326 | |
| 8,251,452 B2 * | 8/2012 | Hill | A47C 15/004 | 297/380 |
| 8,298,845 B2 * | 10/2012 | Childress | A63F 13/08 | 438/47 |
| 8,371,653 B2 * | 2/2013 | Albecker, III | A47C 1/146 | 297/377 |
| D701,917 S * | 4/2014 | Ghahramanian | D21/326 | |
| 8,777,313 B2 * | 7/2014 | Butt | A47C 7/38 | 297/330 |
| 8,794,698 B2 * | 8/2014 | Halsey | A47C 4/286 | 297/153 |
| 9,186,590 B2 * | 11/2015 | Lee | A63G 31/16 | |
| 9,353,903 B2 * | 5/2016 | Kang | A63G 31/16 | |
| 9,782,683 B2 * | 10/2017 | Lee | A63F 13/28 | |
| D835,198 S * | 12/2018 | Berlinches | D21/326 | |
| 10,244,870 B1 * | 4/2019 | Bobst | A47C 7/5062 | |
| 10,413,815 B2 * | 9/2019 | Ergen | A47C 7/72 | |
| 2005/0009611 A1 * | 1/2005 | Masaya | A63F 13/08 | 463/46 |
| 2007/0262628 A1 * | 11/2007 | Perigny | A63F 13/08 | 297/284.4 |
| 2009/0218860 A1 * | 9/2009 | Hernandez | A47C 15/004 | 297/217.3 |
| 2011/0086747 A1 * | 4/2011 | Broderick | A63F 13/24 | 482/142 |
| 2011/0256930 A1 * | 10/2011 | Jaouen | A63F 13/803 | 463/37 |
| 2013/0214572 A1 * | 8/2013 | Douglas | A47C 15/004 | 297/217.5 |

OTHER PUBLICATIONS

Inside SIM Racing: "Playseat Challenge Review by Inside Sim Racing", YouTube, Oct. 25, 2013, 1 pg.

Inside SIM Racing: "GT Omega Wheelstand Review by Inside Sim Racing", YouTube, Jul. 2, 2013, 1 pg.

* cited by examiner

RACING GAMING CHAIR

FIELD OF THE INVENTION

The invention relates to chairs for use while playing video games. More particularly, the invention relates to chairs for use when playing video vehicle racing games.

BACKGROUND OF THE INVENTION

Playing video games is a popular form of entertainment. To enhance the video game experience, accessories are frequently used while playing video games. One type of accessory is seating, which includes features that are superior to conventional chairs.

Some gaming chairs facilitate turning and/or rocking while playing the video games as such movements enhance the gaming experience. Other gaming chairs emit sounds and/or vibrations that are associated with the video games.

SUMMARY OF THE INVENTION

An embodiment of the invention is directed to a racing gaming chair including a seat frame, a back frame, a pedal assembly attachment and a steering wheel assembly attachment. The back frame is pivotally attached to the seat frame. The pedal assembly attachment is operably attached to at least one of the back frame and the back frame. The pedal assembly attachment is adapted for attachment of a pedal assembly thereto. The steering wheel assembly attachment is operably attached to at least one of the seat frame and the back frame. The steering wheel assembly attachment is adapted for attachment of a steering wheel assembly thereto.

Another embodiment of the invention is directed to a method of assembling a racing gaming chair. A back frame is pivoted with respect to a seat frame. A pedal assembly attachment is operably attached to at least one of the back frame and the back frame. The pedal assembly attachment is adapted for attachment of a pedal assembly thereto. A steering wheel assembly attachment is operably attached to at least one of the seat frame and the back frame. The steering wheel assembly attachment is adapted for attachment of a steering wheel assembly thereto.

Another embodiment of the invention is directed to a racing gaming accessory mount including a support frame, a pedal assembly attachment and a steering wheel assembly attachment. The pedal assembly attachment is operably attached to the support frame. Wherein the pedal assembly attachment is adapted for attachment of a pedal assembly thereto. The steering wheel assembly attachment is operably attached to the support frame. The steering wheel assembly attachment is adapted for attachment of a steering wheel assembly thereto.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION OF THE INVENTION

An embodiment of the invention is directed to a racing gaming chair as illustrated at 10 in FIGS. 1-6. The racing gaming chair 10 is particularly designed for use by a person who is playing video games.

The racing gaming chair 10 provides the person sitting on the racing gaming chair 10 with a position that facilitates the person performing motions that are needed while playing the video game. The racing gaming chair 10 may also replicate the components of the activity that is associated with the video game. For example, when the video game relates to operating a vehicle, the racing gaming chair 10 may have a shape that is similar to the shape of a chair that is typically found in the vehicle such as a race car.

Figure 1:
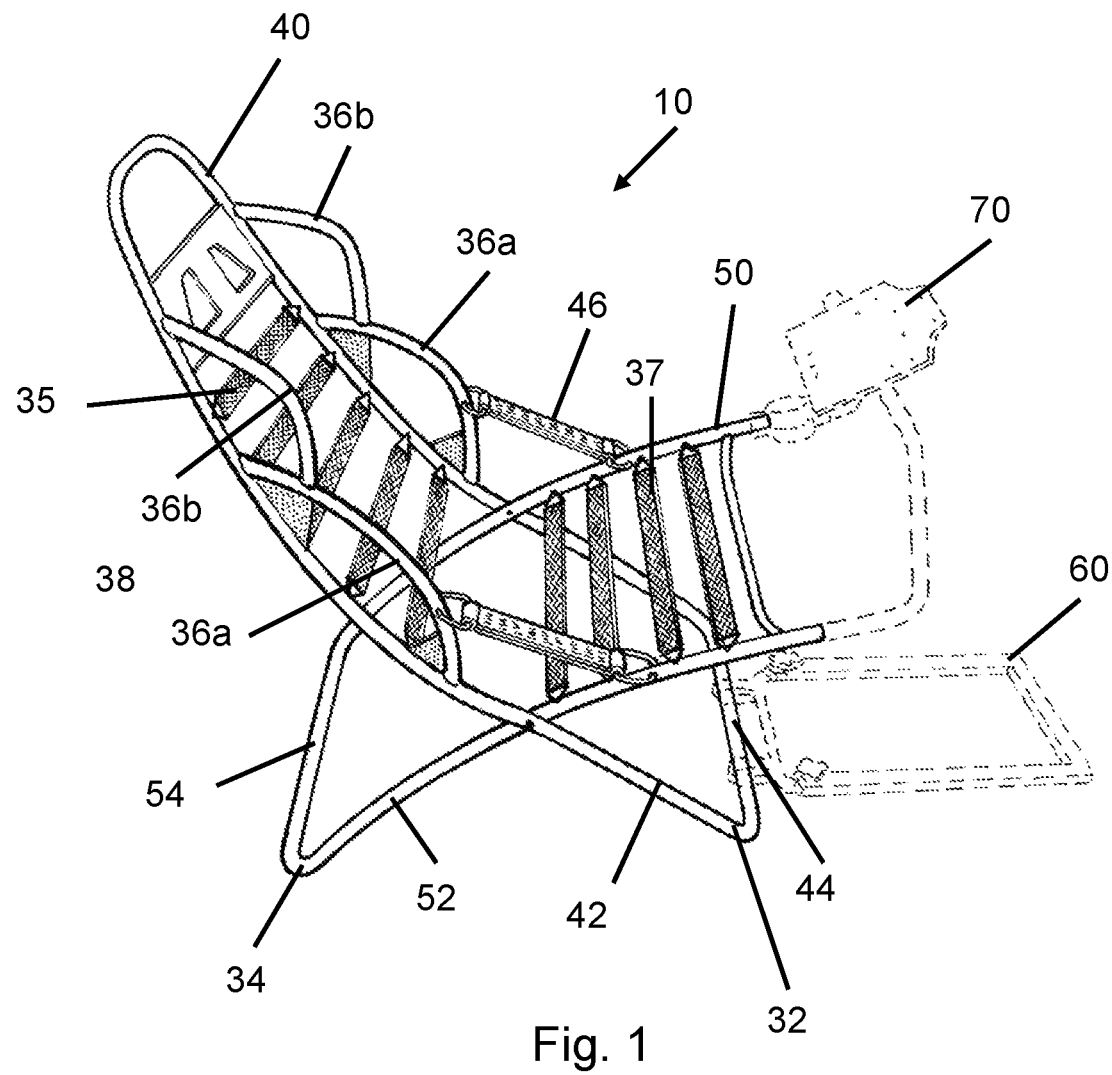
FIG. 1 is a side view of a frame for a racing gaming chair according to an embodiment of the invention.

The racing gaming chair 10 generally a frame 30, which is illustrated in FIG. 1. The frame 30 generally includes a seat portion 20 and a back portion 22 that are operably attached to each other. In certain embodiments, the seat portion 20 is pivotally attached to the back portion 22. One technique for pivotally attaching the seat portion 20 to the back portion 22 is a rivet (not shown). The rivet prevents the seat portion 20 from inadvertently becoming detached from the back portion 22.

The frame 30 maintains the racing gaming chair 10 a spaced-apart distance from a surface on which the racing gaming chair 10 is placed. The distance may be similar to a distance from which a seat in a racing car is spaced above a racing car floor. In certain embodiments, the spacing between racing gaming chair 10 and the surface on which the racing gaming chair 10 is placed is up to about 18 inches.

The frame 30 may also facilitate changing an orientation of at least one of the seat portion 20 and the back portion 22 with respect to the surface on which the racing gaming chair 10 is placed. In certain embodiments an orientation of at least one of the seat portion 20 and the back portion 22 is adjustable to move the racing gaming chair 10 to a more reclined position.

The frame 30 generally includes a back frame member 32 and a seat frame member 34. The back frame member 32 has a first side section 40, a second side section 42 and a lower section 44 that extends between the first side section 40 and the second side section 42 proximate a lower end thereof. In certain embodiments, the first side section 40, the second side section 42 and the lower section 44 are formed from a single piece of material or from separate parts that are joined together to form a single piece of material.

The back frame member 32 may include a plurality of straps 35 that extend between the first side section 40 and the second side section 42. The straps 35 may be at least partially elastic to stretch when a person sits on the racing gaming chair 10 to provide a cushioning affect. In certain embodiments, the straps 35 are sofa grade braided elastic webbing.

The number of straps 35 and the spacing between the straps 35 may be selected based upon a variety of factors. In certain embodiments, there are between about 4 and 10 straps 35 and each of the straps has a width of between about 1 inch and about 3 inches. While it is illustrated that all of the straps 35 have a similar width, it is possible that at least a portion of the straps 35 will have different widths.

A side frame may extend from at least one side of the back frame member 32 to provide the racing gaming chair 10 with a more encompassing feel when a person is setting thereof. In certain embodiments, there is a lower side frame 36a and an upper side frame 36b extending from opposite sides of the back frame member 32. To enhance the ability of the side frame to resist movement with respect to the back frame member 32, at least one reinforcement 38 may be provided that extends between the side frame 36 and the back frame member 32.

The seat frame member 34 has a first side section 50, a second side section 52 and a lower section 54 that extends between the first side section 50 and the second side section 52. In certain embodiments, the first side section 50, the second side section 52 and the lower section 54 are formed from a single piece of material or from separate parts that are joined together to form a single piece of material. The seat frame member 34 may also include a cross member 56 that extends between the first side section 50 and the second side section 52 opposite the lower section 54.

The seat frame member 34 may include a plurality of straps 37 that extend between the first side section 50 and the second side section 52. The straps 37 may be at least partially elastic to stretch when a person sits on the racing gaming chair 10 to provide a cushioning affect. In certain embodiments, the straps 37 are sofa grade braided elastic webbing.

The number of straps 37 and the spacing between the straps 37 may be selected based upon a variety of factors. In certain embodiments, there are between about 4 and 10 straps 37 and each of the straps has a width of between about 1 inch and about 3 inches. While it is illustrated that all of the straps 37 have a similar width, it is possible that at least a portion of the straps 37 will have different widths.

Figure 7:
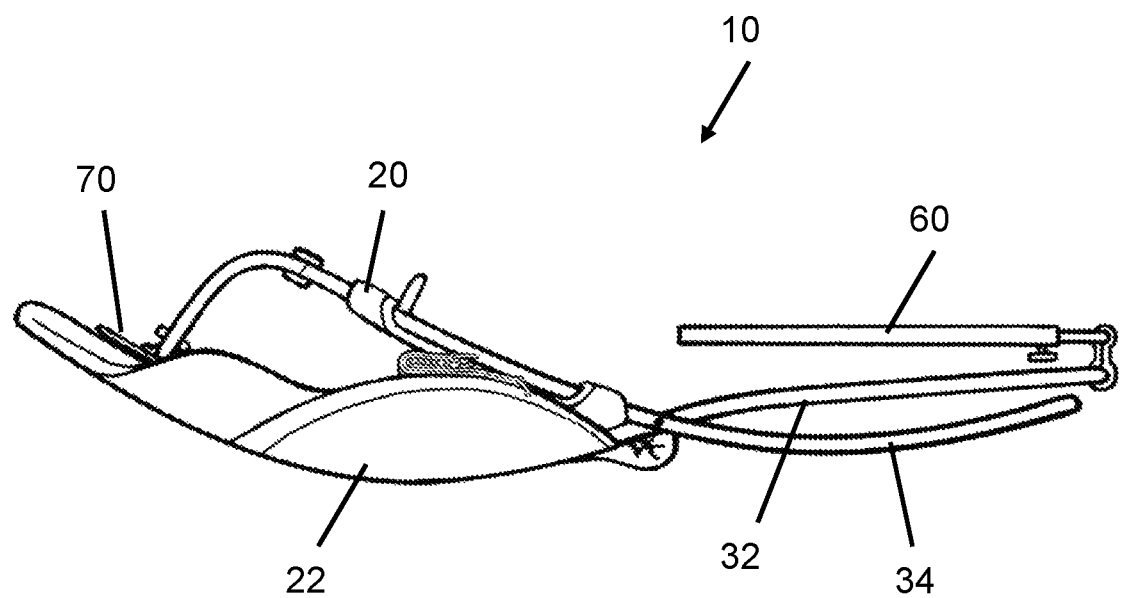
FIG. 7 is a side view of the racing gaming chair of FIG. 2 in a storage configuration.

Pivotally mounting the back frame member 32 to the seat frame member 34 facilitates moving the racing gaming chair between a use configuration (FIGS. 2-6) and a storage configuration FIG. 7 where the back frame member 32 is generally parallel to the seat frame member 34.

A stop mechanism may be provided to limit pivoting of the back frame member 32 with respect to the seat frame member 34. In certain embodiments, the stop mechanism is a brace 46 that extends between the back frame member 32 and the seat frame member 34. While it is illustrated that the brace 46 is provided on both sides of the back frame member, it is possible for the brace 46 to be provided on only one side.

The brace 46 may be fabricated from an at least partially stretchable material. Using such a configuration allows the back frame member 32 to pivot with respect to the seat frame 34 during use of the racing gaming chair 10. In certain embodiments, the brace 46 is fabricated from high strength nylon. The brace 46 may be adjustable to change an angular orientation of the back frame member 32 with respect to the seat frame member 34 such as to provide the racing gaming chair 10 with a greater recline.

When in the use configuration, the back frame member 32 is oriented so that the first side section 40 and the second side section 42 extend upwardly and towards a back end of the seat portion 20 and the seat frame member 34 is oriented so that the first side section 50 and the second side section 52 extend upwardly and towards a front end of the seat portion 20.

When in the use configuration, a distance between the lower section 44 and the lower section 54 may be greater than a distance between a front edge of the seat portion 20 and a back edge of the seat portion 20. Using such a configuration provides the racing gaming chair 10 with a high level of stability to reduce the potential of the racing gaming chair 10 tipping either forward or backward.

The seat portion 20 and the back portion 22 may include padding (not shown) that is provided at least partially beneath a cover material 30. The type and amount of the padding as well as the type and design of the cover material 30 may be selected based upon a variety of factors such as the comfort of the racing gaming chair 10.

At least one of the seat portion 20 and the back portion 22 may include a concave outer surface to provide the person sitting on the racing gaming chair 10 with a cradled feel that is similar to a car in an actual racing car.

The racing gaming chair 10 includes at least one controller attachment 12 to which a controller that is used in conjunction with the video game may be attached. In certain embodiments, the at least one controller attachment 12 may facilitate attachment of a steering wheel assembly (not shown) and a foot pedal assembly (not shown) that are used in conjunction with playing the video game.

Figure 2:
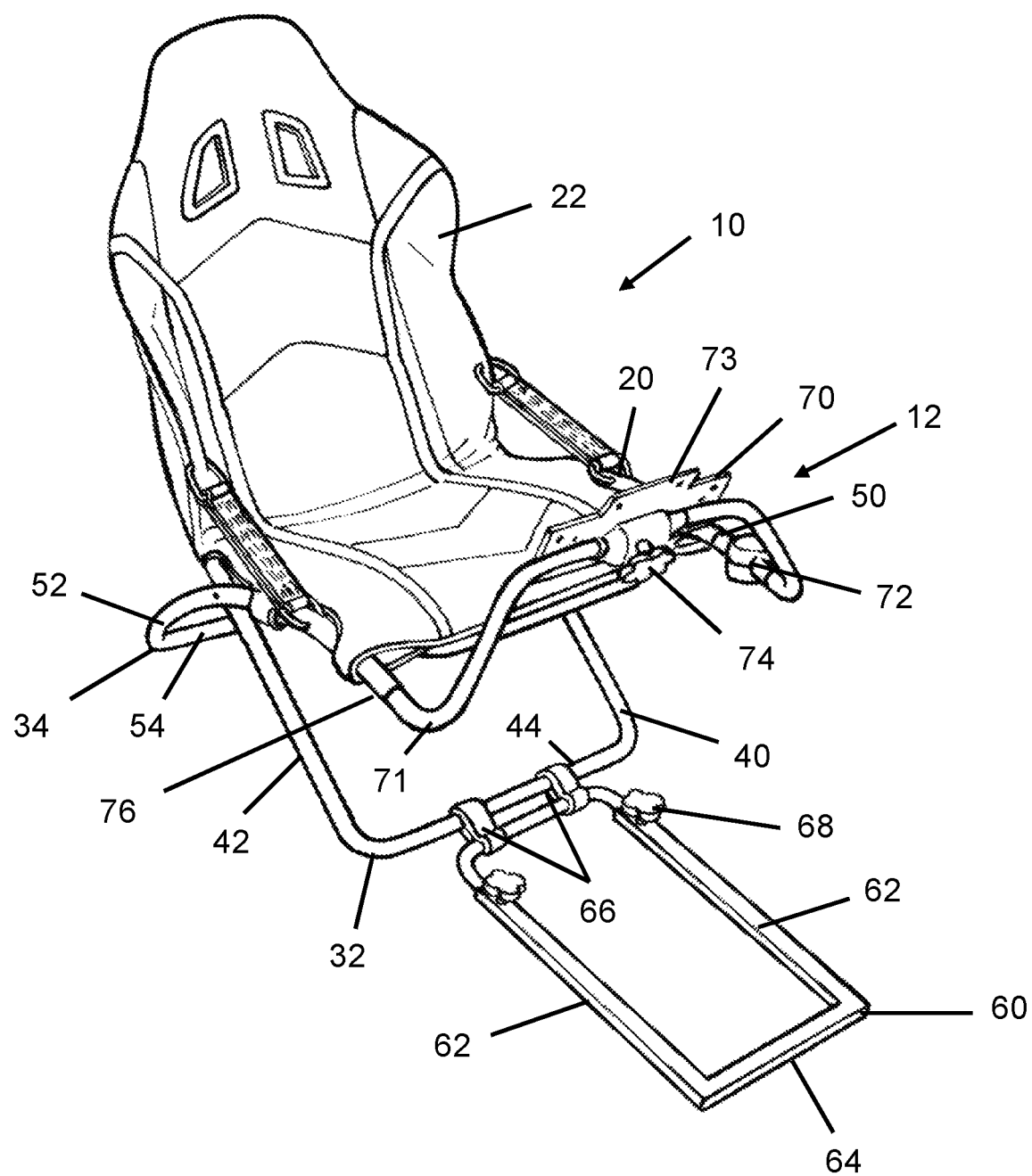
FIG. 2 is a front perspective view of a racing gaming chair according to an embodiment of the invention where the racing gaming chair is in a use configuration.
Figure 3:
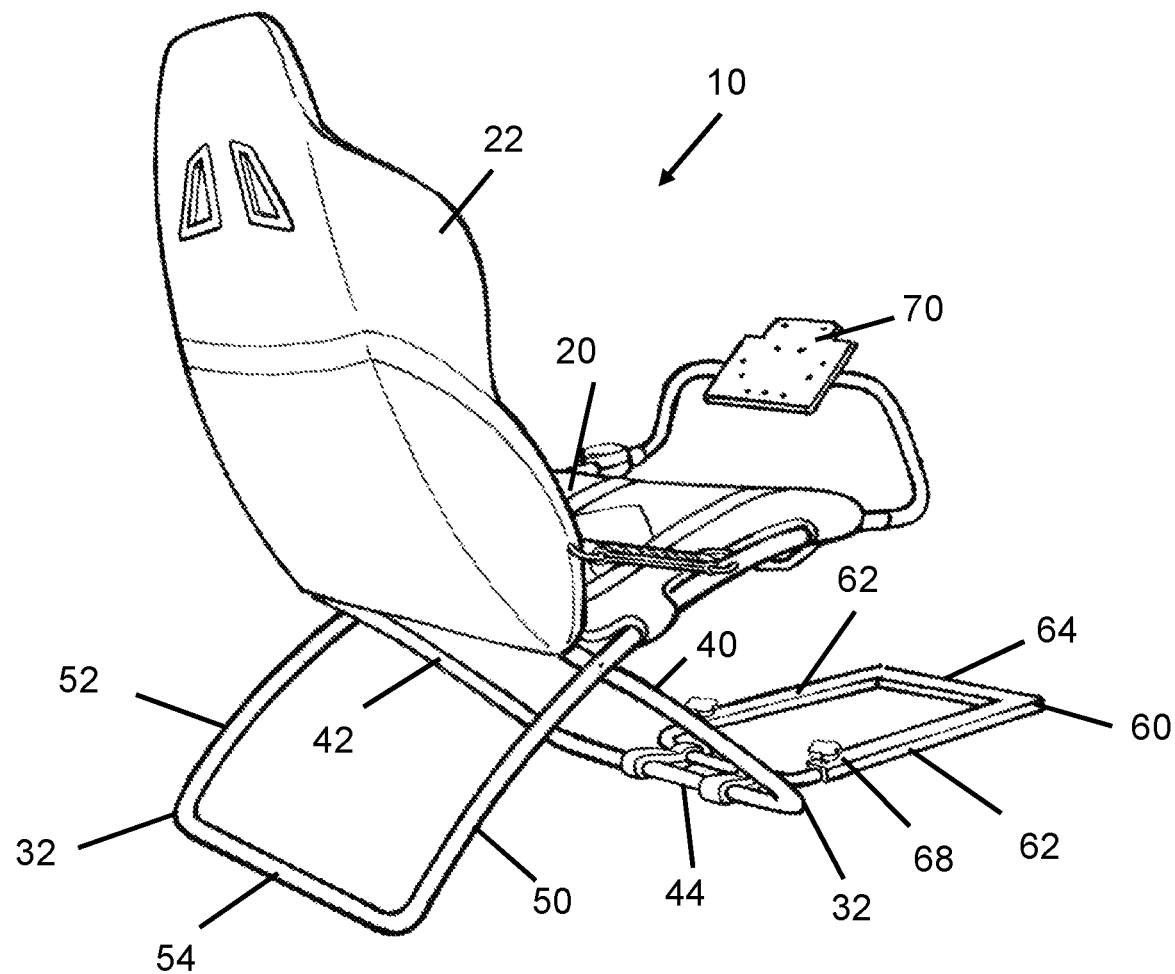
FIG. 3 is a back perspective view of the racing gaming chair of FIG. 2 in the use configuration.
Figure 4:
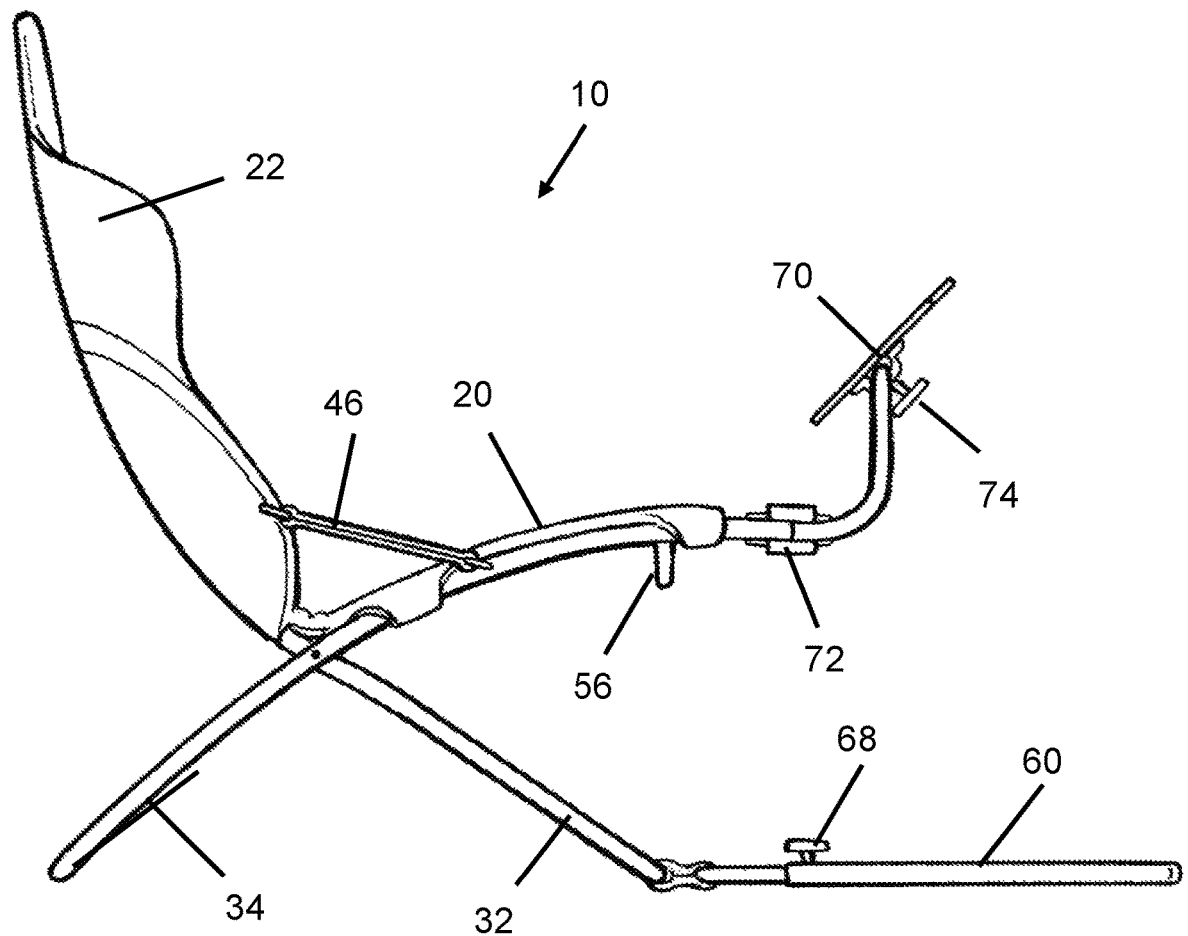
FIG. 4 is a side view of the racing gaming chair of FIG. 2 in the use configuration.
Figure 5:
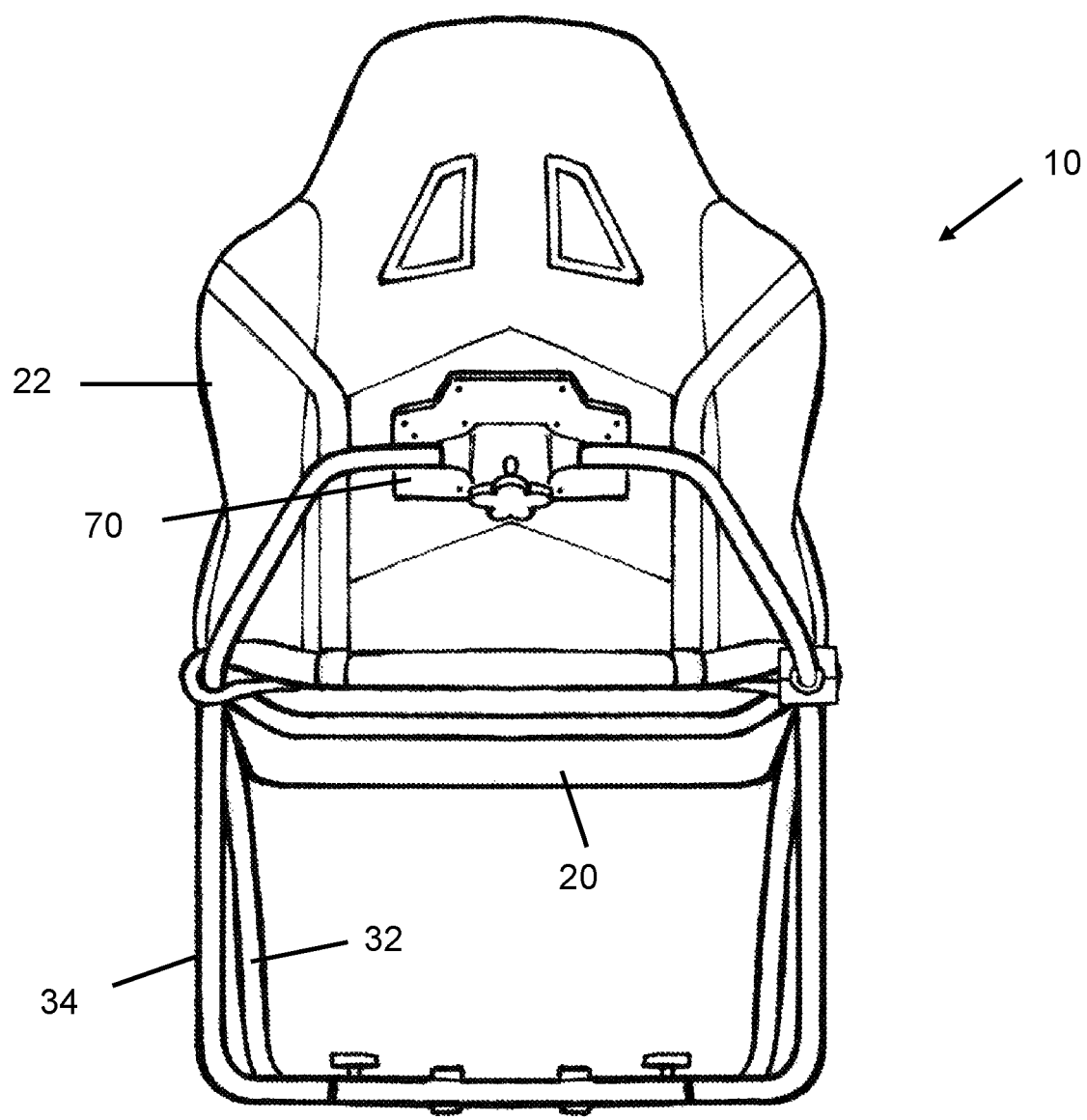
FIG. 5 is a front view of the racing gaming chair of FIG. 2 in the use configuration.
Figure 6:
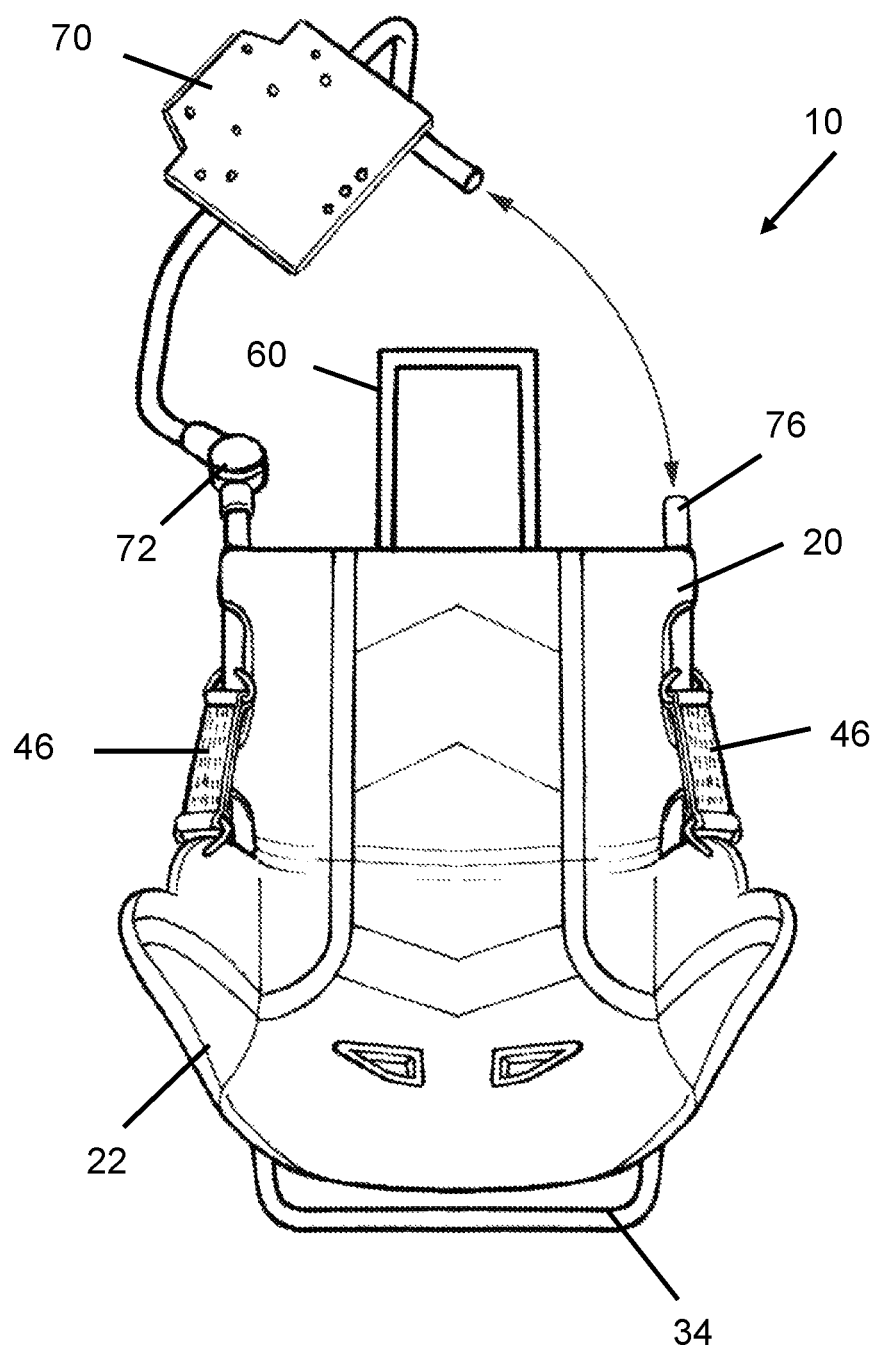
FIG. 6 is a top view of the racing gaming chair of FIG. 2 in the use configuration with a controller mount in an open configuration.

The controller attachment 12 may include a first controller attachment 60 that is operably mounted to the racing gaming chair 10 as illustrated in FIGS. 2-4. In certain embodiments, the first controller attachment 60 is attached to the lower section 44. When in the use configuration, the first controller attachment 60 may lay on the surface on which the racing gaming chair 10 is placed.

The first controller attachment 60 may have a generally elongated configuration with a plurality of openings formed therein for attaching a gaming pedal (not shown) at various locations thereon such as based upon the height of the person who is sitting in the racing gaming chair 10.

In certain embodiments, the first controller attachment 60 may include two side rails 62. Distal ends of the side rails 62 may be attached to each other with an end rail 64. Proximal ends of the side rails 62 may be attached to each other with a near rail.

Each of the side rails 62 may include more than one section that is slidable with respect to each other. Such a configuration enables a distance of the pedal assembly from the racing gaming chair 10 to be adjusted. In certain embodiments, the side rail sections may be maintained in a stationary positioned with connection mechanism 68.

The attachment of the first controller attachment 60 to the racing gaming chair 10 may permit pivoting of the first controller attachment 60 with respect to the racing gaming chair 10. Such a mechanism facilitates moving the first controller attachment 60 between a use configuration and a storage configuration. In certain embodiments, the first controller attachment 60 is attached to the racing gaming chair 10 using at least one clip 66. A person of skill in the art will appreciate that the clip 66 may have a variety of configurations.

The controller attachment 12 may also include a second controller attachment 70 that is operably mounted to the racing gaming chair 10. In certain embodiments, the second controller attachment 70 is attached to at least one of the first side section 40 and the second side section 42 as illustrated in FIGS. 2-4. The second controller attachment 70 may include an arm 71 and a steering wheel assembly mounting plate 73.

At least one end of the arm 71 is operably attached to the seat frame 20. In certain embodiments, the arm 71 is operably attached to the first side member 50 and the second side member 52. At least a portion of the arm 71 may be curved for positioning the steering wheel assembly mounting plate 73 a distance above the seat frame 20 to facilitate use of the steering wheel assembly (not shown) while the person is sitting in the racing gaming chair 10.

The steering wheel assembly mounting plate 73 may have a generally elongated configuration with a plurality of openings formed therein for attaching a steering wheel assembly (not shown) at various locations thereon such as based upon the length of the arms of the person sitting on the racing gaming chair 10.

It may also be possible to change an orientation of the steering wheel assembly mounting plate 73 with respect to the racing gaming chair 10 to suit the preferences of the person sitting in the racing gaming chair 10. In certain embodiments, a knob 74 is used for retaining the steering wheel assembly mounting plant 73 in a desired orientation with respect to the racing gaming chair 10. Additionally or alternatively, a distance of the steering wheel assembly mounting plate 73 with respect to the racing gaming chair 10 may be changeable to suit the preferences of the person sitting in the racing gaming chair 10.

At least one end of the arm 71 may be disengageable to facilitate movement of the second controller attachment 70 when it is desired for the person to get into or out of the racing gaming chair 10.

The operable attachment of the second controller attachment 70 to the racing gaming chair 10 may facilitate moving the second controller attachment 70 to an open configuration (FIG. 6) to enhance the ease at which a person can get into and out of the racing gaming chair 10. A swivel mechanism 72 engages a first end of the arm 71 and allows the second controller attachment 70 to pivot with respect to the racing gaming chair 10.

A coupler 76 may be provided proximate a second end of the arm 71 to retain the second controller attachment 70 in a substantially stationary position with respect to the racing gaming chair 10 during use. A variety of techniques may be used for the coupler 76 to detachably engage the arm 71.

While not illustrated, the racing gaming chair 10 may include at least one speaker and/or at least one vibration mechanism that is associated with the gaming system being played by the person sitting on the racing gaming chair 10. Such components may enhance the experience of the person playing the video games.

Figure 8:
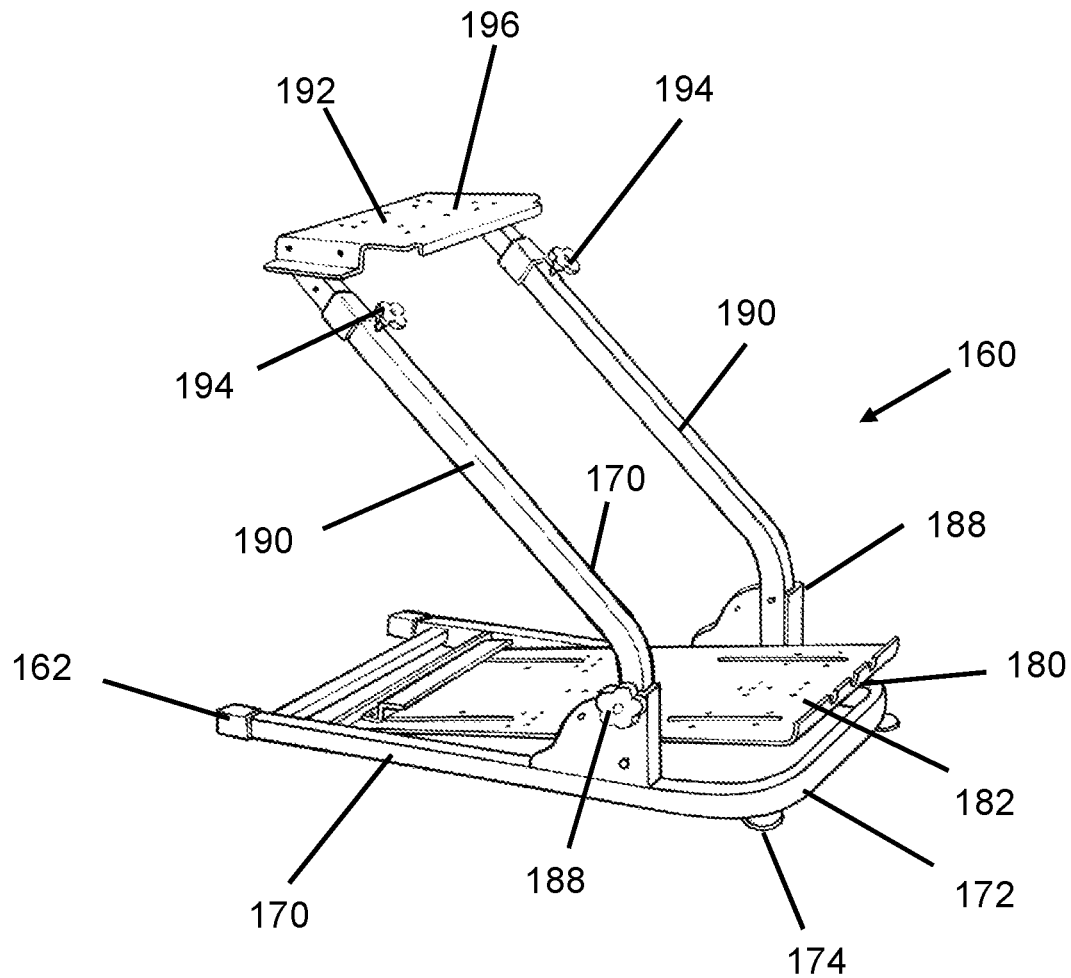
FIG. 8 is a perspective view of a racing game accessory mount according to another embodiment of the invention.

Another embodiment of the invention is directed to a racing game accessory mount 160, which is illustrated in FIG. 8. The racing game accessory mount 160 facilitates attachment of a steering wheel assembly (not shown) and a foot pedal assembly (not shown) with respect to a conventional chair (not shown) on which a person sits while playing racing video games used in conjunction with the steering wheel assembly and the foot pedal assembly.

The racing game accessory mount 160 generally includes a lower frame assembly 162 and an upper frame assembly 164. In certain embodiments, the lower frame assembly 162 may be placed on a ground or floor surface. The lower frame assembly 162 may include side rails 170 and an end rail 172 that extends between the side rails 170.

At least one foot 174 may be mounted with respect to the lower frame assembly 162. The at least one foot 174 may be adjustable to level the racing game accessory mount 160 with respect to the ground surface. Alternatively or additionally, the at least one foot 174 could reduce movement of the racing game accessory mount 160 with respect to the ground surface.

Each of the feet 174 may have a relatively large surface area to reduce the potential of the racing game accessory mount 160 inadvertently moving while playing the video games using the racing game accessories attached to the racing game accessory mount 160. In certain embodiments, the feet 174 have a width that is more than twice the width of the side rail 170.

A pedal assembly mount plate 180 is operably attached to the lower frame assembly 162. The pedal assembly mount plate 180 may have a plurality of apertures 182 formed therein that facilitate attachment of the pedal assembly at different locations on the pedal assembly mount plate 180.

An orientation of the pedal assembly mount plate 180 with respect to the lower frame assembly 162 may be adjustable. In certain embodiments, the angle of the pedal assembly mount plate 180 may be adjusted over an angle of up to about 90 degrees.

The upper frame assembly 164 may include side rails 190 and a steering wheel assembly mount plate 192 that extends between the side rails 190. The side rails 190 are operably attached to the lower frame assembly 162 to facilitate movement between a use configuration (illustrated in FIG. 7) and a storage configuration where the side rails 190 are generally parallel to the lower frame assembly 162.

In certain embodiments, the side rails 190 are operably attached to the lower frame assembly 162 using a mounting pin 186. A knob 188 engages the side rail 190 and the lower frame assembly 162 to retain the side rails 190 in the use configuration or the storage configuration.

Each of the side rails 190 may include more than one section that is slidable with respect to each other. Such a configuration enables a height of the steering wheel assembly to be adjusted. In certain embodiments, the side rail sections are maintained in a stationary positioned with a knob 194.

The steering wheel assembly mount plate 192 has a plurality of apertures 196 formed therein that facilitate attachment of the steering wheel assembly in a variety of positions thereon. An orientation of the steering wheel assembly mount plate 192 with respect to the side rails 190 is adjustable.

While not illustrated, the racing game accessory mount 160 may include at least one speaker and/or at least one vibration mechanism that is associated with the gaming system being played by the person sitting on the racing gaming chair that is positioned proximate the racing game accessory mount 160. Such components may enhance the experience of the person playing the video games.

In the preceding detailed description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The preceding detailed description, therefore, is not to be taken in a limiting sense, and the scope of the present invention is defined by the appended claims.

It is contemplated that features disclosed in this application, as well as those described in the above applications incorporated by reference, can be mixed and matched to suit particular circumstances. Various other modifications and changes will be apparent to those of ordinary skill.

The invention claimed is:

1. A racing gaming chair comprising:
   a seat frame;
   a back frame that is pivotally attached to the seat frame;
   a pedal assembly attachment operably attached to at least one of the seat frame and the back frame, wherein the pedal assembly attachment is adapted for attachment of a pedal assembly thereto; and
   a steering wheel assembly attachment operably attached to at least one of the seat frame and the back frame, wherein the steering wheel assembly attachment is adapted for attachment of a steering wheel assembly thereto and wherein the steering wheel assembly attachment is pivotable about two differently oriented axes with respect to the seat frame.

2. The racing gaming chair of claim 1, wherein the pedal assembly attachment is attached to the back frame and wherein the steering wheel assembly attachment is attached to the seat frame.

3. The racing gaming chair of claim 1, wherein the back frame comprises a first side rail, a second side rail and an end rail that extends between the first side rail and the second side rail and wherein the pedal assembly attachment is pivotally attached to the end rail.

4. The racing gaming chair of claim 1, wherein a length of the pedal assembly attachment is adjustable.

5. The racing gaming chair of claim 1, wherein the steering wheel assembly attachment comprises an arm and a steering wheel assembly mounting plate, wherein the arm is operably attached to the seat frame and the steering wheel assembly mounting plate is operably attached to the arm.

6. The racing gaming chair of claim 5, wherein the arm is pivotally attached to the seat frame and wherein the steering wheel mounting plate is pivotally attached to the arm.

7. The racing gaming chair of claim 1, wherein the seat frame comprises a first side rail, a second side rail and an end rail that extends between the first side rail and the second side rail, wherein the steering wheel assembly attachment is pivotally attached to the first side rail and releasably attached to the second side rail.

8. The racing gaming chair of claim 1, and further comprising a stop mechanism that limits pivoting of the back frame with respect to the seat frame.

9. A method of assembling a racing gaming chair comprising:
   pivoting a back frame with respect to a seat frame;
   operably attaching a pedal assembly attachment to at least one of the seat frame and the back frame, wherein the pedal assembly attachment is adapted for attachment of a pedal assembly thereto;
   operably attaching a steering wheel assembly attachment to at least one of the seat frame and the back frame, wherein the steering wheel assembly attachment is adapted for attachment of a steering wheel assembly thereto; and
   pivoting the steering wheel assembly attachment about two differently oriented axes with respect to the seat frame.

10. The method of claim 9, wherein the pedal assembly attachment is attached to the back frame and wherein the steering wheel assembly attachment is attached to the seat frame.

11. The method of claim 9, wherein the back frame comprises a first side rail, a second side rail and an end rail that extends between the first side rail and the second side rail and wherein the pedal assembly attachment is pivotally attached to the end rail.

12. The method of claim 9, and further comprising adjusting a length of the pedal assembly attachment.

13. The method of claim 9, and further comprising pivoting the steering wheel assembly attachment about two differently oriented axes with respect to the seat frame.

14. The method of claim 9, wherein the steering wheel assembly attachment comprises an arm and a steering wheel assembly mounting plate and wherein the method further comprises:
   pivotally attaching the arm to the seat frame; and
   pivotally attaching the steering wheel assembly mounting plate to the arm.

15. The method of claim 9, wherein the seat frame comprises a first side rail, a second side rail and an end rail that extends between the first side rail and the second side rail and wherein the method further comprises:
   pivotally attaching the steering wheel assembly attachment to the first side rail; and
   releasably attaching the steering wheel assembly attachment to the second side rail.

16. The method of claim 9, and further comprising limiting pivoting of the back frame with respect to the seat frame with a stop mechanism.

17. The method of claim 9, and further comprising pivoting the seat frame with respect to the back frame to a storage position where at least a portion of the seat frame is parallel to at least a portion of the back frame.

18. A racing gaming accessory mount comprising:
   a support frame;
   a pedal assembly attachment operably attached to the support frame, wherein the pedal assembly attachment is adapted for attachment of a pedal assembly thereto; and
   a steering wheel assembly attachment operably attached to the support frame, wherein the steering wheel assembly attachment is adapted for attachment of a steering wheel assembly thereto and wherein the steering wheel assembly attachment is pivotable with respect to two differently axes with respect to the support frame.

19. The racing gaming accessory mount of claim 18, where the pedal assembly attachment is pivotable with respect to the support frame.

20. The racing gaming accessory mount of claim 18, wherein the steering wheel assembly attachment comprises at least one arm and a steering wheel assembly mounting plate, wherein the at least one arm is operably attached to the support frame and the steering wheel assembly mounting plate is pivotally attached to the at least one arm.

21. The racing gaming accessory mount of claim 20, wherein a length of the at least one arm is adjustable.

* * * * *